United States Patent
Dieterle et al.

(10) Patent No.: US 7,600,664 B2
(45) Date of Patent: Oct. 13, 2009

(54) WELDING DEVICE AND METHOD FOR WELDING WORKPIECES

(75) Inventors: Horst Dieterle, Niederweimar (DE); Peter Wagner, Wettenberg (DE)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 197 days.

(21) Appl. No.: 10/558,370

(22) PCT Filed: Jul. 2, 2004

(86) PCT No.: PCT/EP2004/007204
§ 371 (c)(1),
(2), (4) Date: Jan. 3, 2006

(87) PCT Pub. No.: WO2005/002778
PCT Pub. Date: Jan. 13, 2005

(65) Prior Publication Data
US 2006/0231585 A1    Oct. 19, 2006

(30) Foreign Application Priority Data
Jul. 4, 2003    (DE) ................... 103 30 431

(51) Int. Cl.
*B23K 1/06*    (2006.01)
*B23K 5/20*    (2006.01)
*B23K 37/00*    (2006.01)
*B23K 20/10*    (2006.01)

(52) U.S. Cl. .................... 228/1.1; 228/110.1

(58) Field of Classification Search ............. 228/1.1, 228/110.1
See application file for complete search history.

(56) References Cited

U.S. PATENT DOCUMENTS

| | | | |
|---|---|---|---|
| 3,257,721 A | | 6/1966 | Jones |
| 3,750,926 A | | 8/1973 | Sakamoto et al. |
| 4,786,356 A | | 11/1988 | Harris |
| 4,869,419 A | * | 9/1989 | Nuss .................. 228/110.1 |
| 5,682,803 A | * | 11/1997 | Boianjiu ................ 82/1.11 |
| 5,810,518 A | * | 9/1998 | Wiman et al. ............ 407/102 |
| 6,146,060 A | | 11/2000 | Koskinen et al. |
| 6,299,052 B1 | | 10/2001 | Wanek et al. |

FOREIGN PATENT DOCUMENTS

| | | |
|---|---|---|
| DE | 3700257 | 7/1988 |
| DE | 4429684 | 2/1996 |
| DE | 19540860 | 5/1997 |
| DE | 20020525 | 5/2001 |
| EP | 0761370 | 3/1997 |

* cited by examiner

*Primary Examiner*—Jerry Lorengo
*Assistant Examiner*—Kevin M Johnson
(74) *Attorney, Agent, or Firm*—Dennison, Schultz & MacDonald

(57) ABSTRACT

The invention concerns an ultrasonic welding device, which is more fully integrated by adjacent components of coupling surface. In order to permit a adequately fixed connection between the components, while, at the same time simplifying the mounting, it is suggested that at least some of the integrated components (30, 34) are structured in their coupling surfaces (40, 42), which lie on top of each another, for the achievement of a form closure.

15 Claims, 3 Drawing Sheets

WELDING DEVICE AND METHOD FOR WELDING WORKPIECES

This application is a filing under 35 USC 371 of PCT/EP2004/007204 filed Jul. 2, 2004.

BACKGROUND OF THE INVENTION

The invention concerns a welding device, in particular an ultrasonic welding device, more fully integrated by adjacent components of coupling surfaces, such as a sonotrode and a booster, booster and converter, sonotrode and sonotrode head or carrying and working parts of a limiting, multipart anvil of a compression chamber. Further, the invention refers to a method for welding elongated, such as braid-like, workpieces via an ultrasonic device having a compression chamber containing workpieces, which is delimited by a sonotrode section, an opposite anvil section, and lateral limiting components, by which the width of the compression chamber is adjusted, whereby the workpieces are first placed in the compression chamber, near the enclosed, or partially compression chamber, enclosed by the anvil section, which is then focused on the total transverse area of the workpieces to be welded, which are subsequently welded by excitation of the sonotrode.

From DE-C-37 00 257 an ultrasonic welding device with a sonotrode is known, which is contacted over wedge-shaped coupling surfaces and fully integrated via a bolt connection.

From EP-B-0 761 370 an ultrasonic welding device with a sonotrode at the respective end of limiting boosters is described, which are based on ring circuit surfaces. An integrated connection is made via a bolt.

The construction of an ultrasonic welding device is described in the German publication entitled "Die Bibliothek der Technik," Vol. 108, Ultrasonic Metal Welding, Moderne Industrie (publisher), Landsberg/Lech, 1995, page 34. It is therefore explained in detail that the coupling surfaces between the booster and converter, sonotrode respectively, must be level and lapped, so that, if possible, no losses occur during the transfer of energy. During non-observance, undesired heating, noise development, and possible self-destruction may occur.

In particular, with a multipart sonotrode or anvil, high forces must be generated for the required grip in order to rule out, by initiating transverse forces, that a change in geometry has taken place.

Thus, it is required that the coupling surfaces be evenly tuned, that when mounting, an accurate alignment between the elements occurs, in order to ensure reproducible welding results.

From U.S. Pat. No. 6,299,052 a technique for welding electrical conductors by means of ultrasound is known, with which an ultrasonic welding device having a compression chamber adjustable in height and width can be used. By placing the conductors, the width of the compression chamber is always adjusted in such a way that the conductors are positioned above each other in a column. Thus, the temporary drawback arises that, particularly, if a large number of conductors were to be welded together, placing is essential, so that the temporal distance between each another is largely undesired in subsequent weldings.

A technique for compacting and the subsequent welding of electrical conductors is taken from DE-A-44 29 684. A compression chamber is limited by a slide valve, which is integrated with a base component via a bolt.

Likewise, a compression chamber of an ultrasonic welding device adjustable by height and width is known from DE-A-195 40 860. The components, which are delimited by the compression chamber, such as slide valves and anvils, in principal, consist of several parts, which are integrated via bolts.

According to DE-A-38 07 154, a high frequency resonator can be combined with a booster or converter via a bolt connection.

From carrying and working parts, existing limiting components of an ultrasonic welding device compression chamber are known from DE-U-200 20 525. The connection between carrying and working parts is made via bolts.

The present invention uses the problem as a basis to develop a welding device of the type initially specified in such a way that, on the one hand, an adequately fixed connection is given between the components, but, at the same time, a simplification in mounting occurs when assembling the components. Also, initiated transverse forces may be created without difficulty.

SUMMARY OF THE INVENTION

In accordance with the invention, the problem is essentially solved by a welding device of the type initially specified by the fact that at least some of the integrated components are structured in their coupling surfaces, which lie above each other, in order to achieve a form closure.

In a deviation from the known state of the art, it is proposed that the coupling or contact surfaces between the integrated components permit a form closure, whereby a self-centering occurs when mounting. At the same time, the form closure offers the benefit that, on the one hand, an enlargement of the contact surface takes place, and, on the other hand, transverse forces can be created, so that the forces required for the grip can be reduced compared with known ultrasonic welding devices.

In particular, it is proposed that the coupling surface be structured by linear-shaped projections, which are delimited by recesses and developed as per the projection head geometry of the assigned coupling surface. So, it is proposed, in particular, that the linear-shaped projections run parallel to each other, whereby the first run parallel to each other and the second can be proposed as linear-shaped projections that run parallel to each other, which, favorably intersect at a 90-degree angle or approximately a 90-degree angle.

Also the possibility exists that the linear-shaped projections may extend along concentric circles.

A structuring is also possible thereby that the coupling surface be structured by pyramidal (or pyramidal truncated) and conical (or conical truncated) projections, whereby adjacent recesses follow the projection geometry of the assigned coupling surface.

In a further development of the invention, it is proposed that the projection, on average, exhibits triangle geometry, in particular equilateral triangle geometry. Therefore, the sides of an angle α can favorable enclose an approximately 60-degree or 90-degree angle. However, trapezoidal geometry is also possible, whereby their sides would likewise favorably encompass an angle α of approximately 60-degrees or 90-degrees.

Other suitable coupling surface geometries for achieving the desired form closures are also possible. So, the projections, on average, can exhibit saw tooth geometry or wave geometry, whereby a sinusoidal path is preferred.

Preferably, if the projection edges intersect each other in the base, then the possibility exists after further developing the invention that the projections are distanced parallel to each other by the sections of the coupling surface, which run in an extended plane from the coupling surface.

As a result of the coupling surface development, which is pursuant to the invention, for the purpose of achieving a form closure, the benefit arises that a clear positioning of the components to be interconnected is permitted. At the same time, the forces required for the connection, which are initiated over connection components, such as bolts, can be reduced. Via the form closure, transverse forces are created, especially when welding, whereby dimensional stability between the integrated components is insured.

A technique for welding elongated, linear-shaped workpieces, in particular conductors, of the kind initially specified is characterized by the fact that if M workpieces (where $M \leq 4$) are welded, the width of the compression chamber is adjusted in such a way that the workpieces are positioned above each other in the compression chamber, and that, if N workpieces (where N>4) are welded, the workpieces are positioned both next to each other and one above each other.

Via the method, which is pursuant to the invention, the possibility is opened to align the compression chamber by placing the conductors optimally to their number. So, the lateral limiting components can then be maximally distanced to each other, if a large number of conductors are welded together. After placing the conductors, the width of the compression chamber is then reduced, whereby the conductors are compacted to their required circumferences. This occurs, in particular, at the same time, through the anvil section with a plugged compression chamber. After the compression chamber exhibits the desired width, the anvil is shifted toward the sonotrode. After achieving the desired pressure, path, or force value, the sonotrode is then excited.

Should only a small number of linear-shaped workpieces, such as conductors, be welded, then these must be arranged one above each other by adjusting the width of the compression chamber, in order to ensure an optimal weld.

Adjusting the width of the compression chamber as a function of the number of conductors to be welded can take place either by program control or manually.

Further details, advantages and features of the invention result not only from the claims and features disclosed therein, per se, or in combination, but also from the following description of the preferred embodiments shown in the drawings, wherein

DESCRIPTION OF THE PREFERRED EMBODIMENTS

Figure 1:
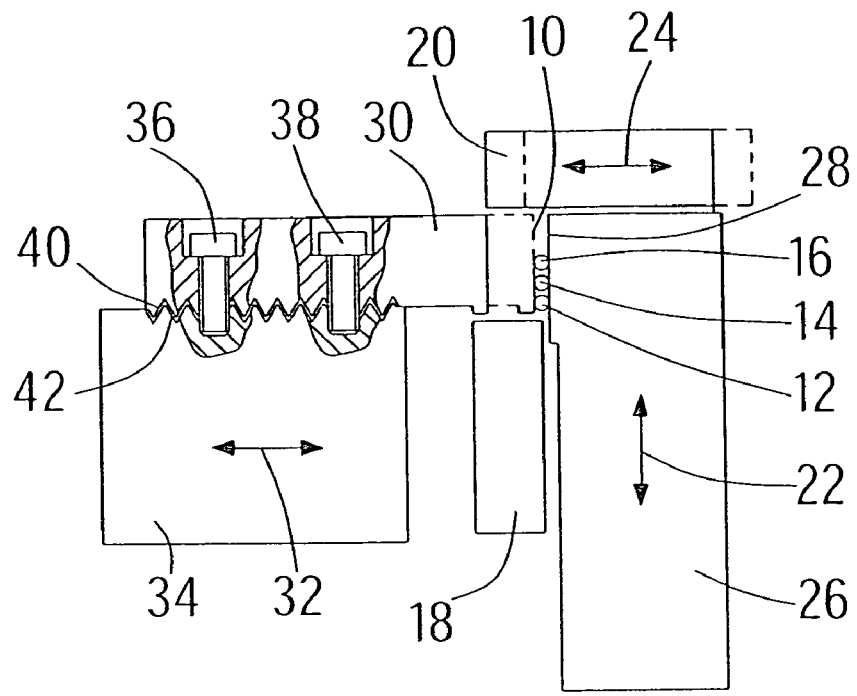
FIG. 1 a design example of the components of an ultrasonic welding device for the construction of a compression chamber, FIG. 2 a design example of an adjustable anvil with bolted on working part, FIG. 3 two integrated components of an ultrasonic welding device.

FIG. 1 depicts the limiting components of a compression chamber 10 of an ultrasonic welding device, in order to compact and weld long, extended, braid-like workpieces, such as conductors 12, 14, 16. In the diagram, the compression chamber 10 is delimited at the bottom by a working surface of a sonotrode 18. Opposite to sonotrode 18 is an anvil 20, which is raised and lowered (double arrow 22) so as to move parallel to the working surface of sonotrode 18 (double arrow 24). The anvil 20 proceeds thereby from a support 26, which, with a section 28, forms a right lateral limiting surface of the compression chamber 10. Opposite is an adjustably arranged slide valve 30 (double arrow 32), which proceeds from support 34. By adjusting the slide valve 30, support 34 respectively, the height of compression chamber 10 can be adjusted. According to the width of compression chamber 10, the working surface of anvil 20, which is opposite the working surface of sonotrode 18 is automatically adjusted. The height of compression chamber 10, which can be aligned to the total transverse section of workpieces 14, 16, is adjusted by shifting the column, support 26 respectively, of anvil 20.

As FIG. 1 further points out, slide valve 30 is full integrated with support 34 by bolts 36, 38. Furthermore, the coupling surfaces 40, 42 of slide valve 30 and support 34 is structured in such a way that that, additionally, a form closure results.

Figure 2:
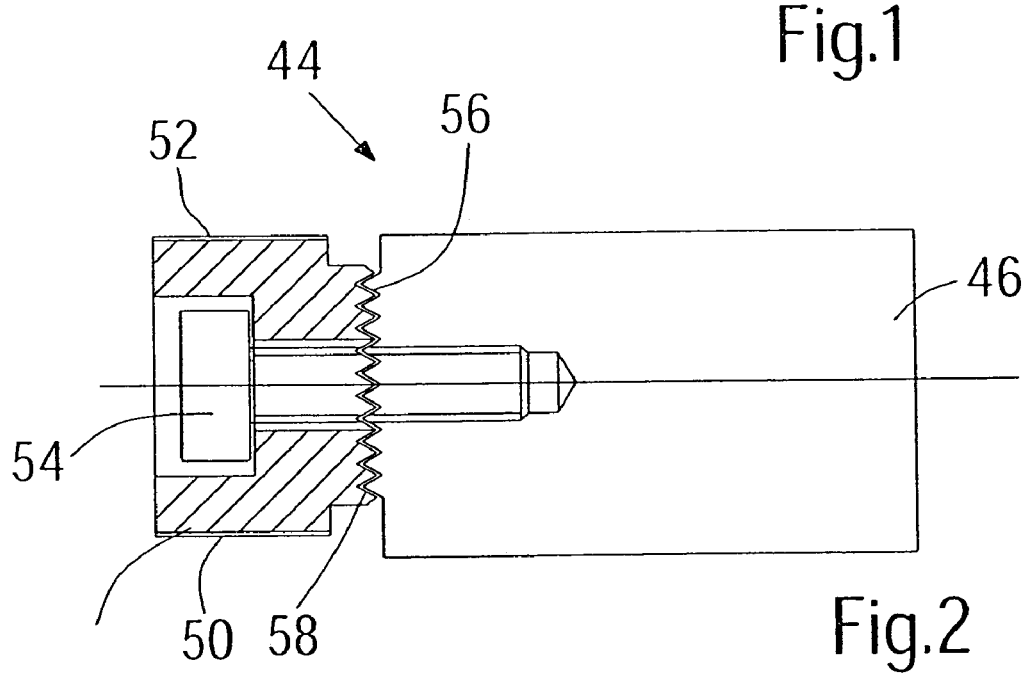

However, not only between slide valve 30 and support 34 can an integrated connection be made, but also in principal between all the connected components of an ultrasonic welding device, in particular those subjected to forces conditioned by welding. Thus, FIG. 2 depicts a design diagram of an anvil 44, anvil slide valve respectively, which is formed from a right parallelpiped base 46 and a working part 48, and which preferably exhibits working areas 50, 52 on opposite sides, from which a limiting surface of a compression chamber forms as shown in detail in FIG. 1.

The base 46 is fully integrated with working part 48 by a bolt 54. Additionally, in order to achieve a form closure, they are both formed from the base 46, as well as from the anvil of their coupling surfaces 56, 58. Accordingly, a sonotrode of an exhibiting sonotrode head can be trained with one or more working surfaces. Also, the possibility exists of connecting several working parts, which, at the same time, perform the function of a sonotrode head, with the base of the sonotrode, which is in accordance with the theory of the invention.

Figure 3:
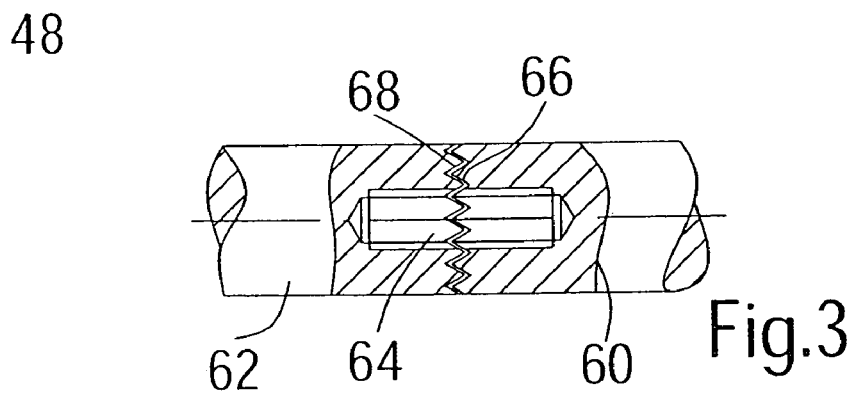

FIG. 3 depicts sections, for example, of a booster 60 or a base of a sonotrode 62, which are fully integrated by a bolt 64. Furthermore, coupling surfaces 66, 68, which are opposite each another, are structured in such a way that a proposed form closure is given. The coupling surfaces are increased via these measures, a self centering of the components 60, 62 to be connected is achieved, as well as a cushioning of influencing transverse forces.

The intended form closure trained structuring of coupling surfaces 40, 42, 56, 58 or 66, 68 can be achieved by a desired surface geometry formation. Examples are shown in FIGS. 4-14. Thus, a coupling surface 70 can exhibit elevations 72, 74, running parallel to each other, which are separated by a corresponding groove 76. If the coupling surfaces, which lie on each another, are uniformly trained, then the trench exhibits a geometry that is congruent to projection 72, so that an assigned coupling surface of a surface 70 exhibits a corresponding geometry.

Of course, the possibility also exists that the coupling surfaces, which lie above each other, can be structured differently. In this case, however, a structural enlargement must be given in such a manner that the desired intended form closure is attainable.

Figure 4:
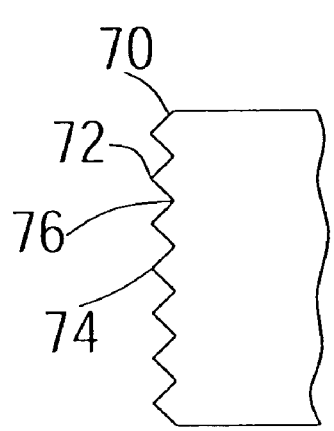
FIG. 4 an initial drawing of a structured component of an ultrasonic welding device, FIG. 5 the coupling area as shown in FIG. 4 as viewed from above, FIG. 6 a second drawing of an exhibited component, i.e. a structured coupling surface.
Figure 5:
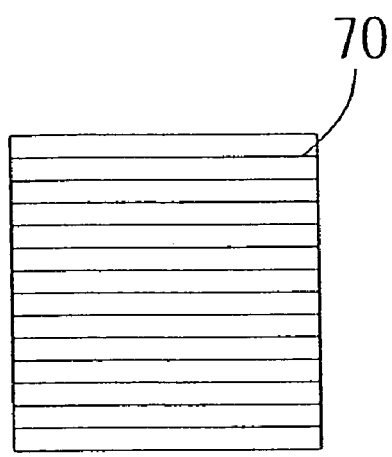
Figure 6:
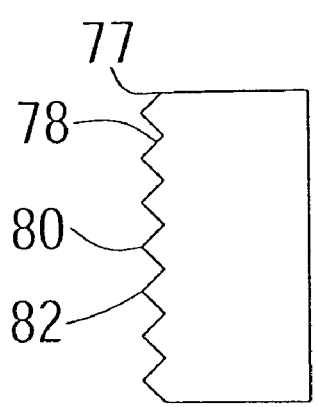
Figure 7:
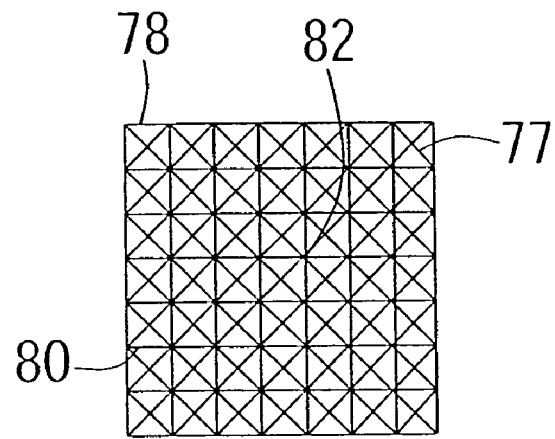
FIG. 7 the coupling surface shown in FIG. 6 as viewed from above.

In the drawings of FIGS. 4 and 5, the linear-shaped elevations 74, 76 are arranged as exclusively running parallel to each other, so that the possibility exists, according to FIGS. 6 and 7, that elevations 78, 80, 82 of coupling surface 77 are arranged intersecting each other, as FIG. 7, in particular, clarifies.

Figure 8:
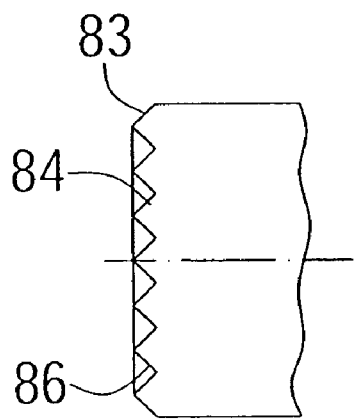
FIG. 8 a third drawing of an exhibited component, i.e. a structured coupling surface, FIG. 9 the coupling surface showing in FIG. 8 as viewed from above, FIG. 10 an initial drawing of a coupling surface in detail, FIG. 11 a second drawing of a coupling surface in detail, FIG. 12 a third drawing of a coupling surface in detail, FIG. 13 a fourth drawing of a coupling surface in detail and FIG. 14 a fifth drawing of a coupling surface in detail.
Figure 9:
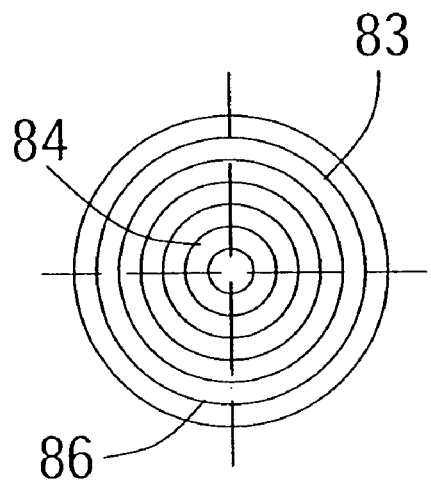

However, a concentric arrangement of linear-shaped elevations 84, 86 in coupling surface 83 is possible, as shown in FIGS. 8 and 9.

FIGS. 10-14 show the preferred cross section geometry of the preferably linear-shaped coupling surface elevations. It is to be noted, however, that it is not imperative for the elevations to be linear-shaped for the structuring and achievement of a form closure. Rather, for structural development, pyramidal (or pyramidal truncated, respectively) and conical (or conical truncated, respectively) elevations can also be proposed corresponding to adjacent recesses.

Figure 10:
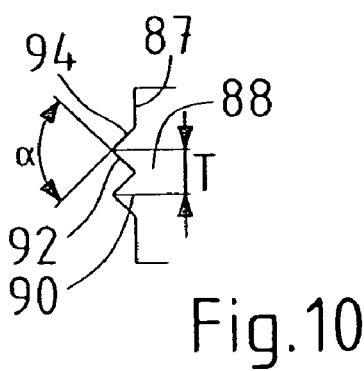

According to the drawing in FIG. 10, elevations 88, 90 of coupling surface 87 exhibit, on average, an equilateral triangle geometry, whereby sides 92, 94 enclose an angle α, which can be, for example, 60-degrees, 90-degrees, or approximately 60-degrees or 90-degrees. The distance between elevations 88, 90 from apex to apex is shown by T and preferably falls in the range of 0.5 mm<T>5 mm. The height of projection 88, 90 may fall between 0.5 mm and 2.5 mm.

Figure 11:
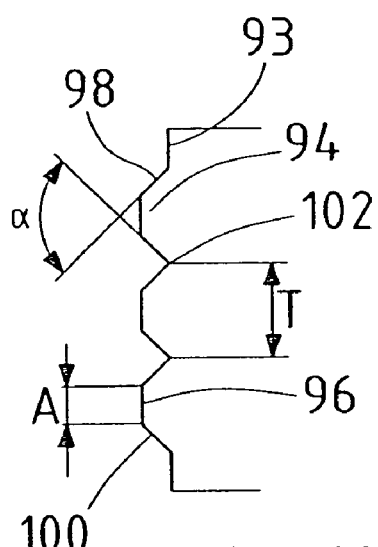
Figure 12:
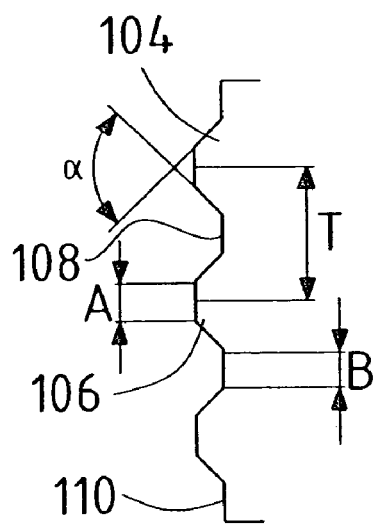

According to FIG. 11, trained projection structures 94, 96 of a coupling surface 93, on average, exhibit a trapezoidal geometry, whereby sides 98, 100 may enclose an angle α, for example, of 60 or 90-degrees. The elevations merge at the bottom, so that they are delimited via v-shaped grooves. The distance T between the projections preferably falls in the range of 0.5 mm<T>5 mm. The height, in particular, may lie between 0.5 mm and 2.5 mm.

Likewise, the projections 104, 106 of a coupling surface 110, on average, exhibit trapezoidal geometry. The projections are thereby delimited by a level base section 108, which are parallel to the extended plane or sections of the coupling surface 110.

The distance between projections 104, 106 preferably falls between 0.7 mm and 6 mm. The projections 104, 106, moreover, exhibit a plateau-like, even, outer surface, which exhibits a preferred width between 0.1 mm and 3 mm.

The base sections 108 exhibit a width B between 0.1 mm and 3 mm. Therefore, the structure should be so designed that widths A and B are, in each case, smaller than the distance T. The height of the projections 104, 106 may fall between 0.5 mm and 2.5 mm.

Figure 13:
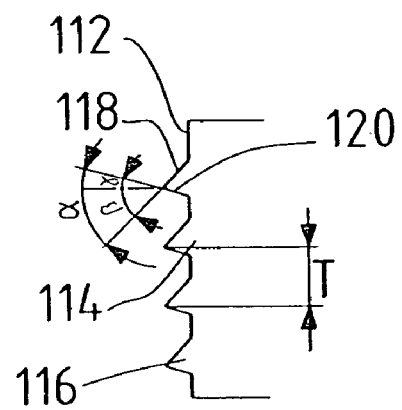

According to FIG. 13, a coupling surface 112 exhibits a saw tooth-like structure via non-equilateral triangles of the following projections 114, 116 with a distance T between 0.5 mm and 5 mm. The projections 114, 116 exhibit sides 118, 120, which enclose a preferred angle α with $45°\leq α \leq 75°$. Side 118 exhibits a preferred angle γ with $15°\leq γ \leq 45°$ for the normalization of the coupling surface 112, and side 120 exhibits a preferred angle β with $15°\leq β \leq 45°$. The distance T between projections 114, 116 falls between 0.5 mm$\leq$T$\leq$5 mm. The height may be chosen between 0.5 mm and 2.5 mm.

Figure 14:
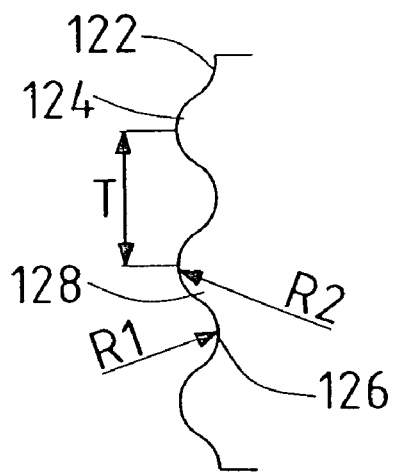

However, a coupling surface 122 exhibiting wave geometry is also possible according to FIG. 14, in order to achieve the desired form closures between coupling surfaces lying on top of each other. Wave geometry preferably follows a sine path, whereby the radii of curvature $R_1 R_2$ of projection 122, valley 124 respectively, may deviate from each other. The distance between sequential projections 124, 128 may fall between 0.5 mm$\leq$T$\leq$5 mm.

In order to optimally weld conductors independently of their number, it is suggested by this invention that the number of conductors 12, 14, 16 of compression chamber 10 be adjusted by placing workpieces of a given width, which subsequently permit an optimal welding procedure. So that, if two or three conductors are welded together, the compression chamber 10 is adjusted to a width that ensures that the conductors are arranged in a column one above the other in the compression chamber 10, as shown in FIG. 1, and in the schematic diagram of slide valve 30. By placing the workpieces 12, 14, 16, the anvil 20 is shifted to the right, in order to release the compression chamber 10 from above (schematic diagram of the anvil 20).

If more than four workpieces are welded together against it, then the compression chamber 10 is optimally opened for placing workpieces as shown in the cross-sectional diagram. The width is given, in this case, by the maximum limiting surfaces of the compression chamber 10 provided by sonotrode 10.

After the conductors have been placed in an appropriately wide opened compression chamber 10, the slide valve 30 is shifted toward the support, respectively column 26. Then the slide valve 30 is lowered toward sonotrode 18. At the same time, an excitation of sonotrode 18 occurs, in order to perform the welding.

The invention claimed is:

1. An ultrasonic welding device, comprising a sonotrode and a multipart anvil delimiting a compression chamber,
    said multipart anvil comprising a slide element, a working part with at least one working surface, at least a part of the working surface delimiting said compression chamber, and a support for the slide element, the support being slidable to open and close the compression chamber,
    said working part and said slide element having coupling surfaces in contact with each other for achieving a form-fitting connection,
    wherein a first of said coupling surfaces comprises linear-shaped projections, and is coupled with a second of said coupling surfaces comprising pyramidal, truncated pyramidal, conical or truncated conical projections and recesses adjacent to said projections, whereby the recesses of the second coupling surface correspond geometrically to the projections of the first coupling surface.

2. Ultrasonic welding device according to claim 1, wherein the linear-shaped projections run parallel to each other.

3. Ultrasonic welding device according to claim 1, wherein the linear-shaped projections extend along a plurality of circles which run concentrically to each other.

4. Ultrasonic welding device according to claim 1, wherein the projections, on average, exhibit trapezoidal geometry, and wherein a side encloses an angle α of 60° or 90°.

5. Ultrasonic welding device according to claim 1, wherein the coupling surfaces are structured by projections which are distanced from sections of the coupling surfaces which run in extended planes parallel to each other.

6. Ultrasonic welding device according to claim 1, wherein the first coupling surface exhibits first and second groups of parallel linear-shaped projections.

7. Ultrasonic welding device according to claim 6, wherein first and second groups of parallel linear-shaped projections intersect at an angle of approximately 90°.

8. Ultrasonic welding device according to claim 1, wherein the pyramidal, truncated pyramidal, conical or truncated conical projections exhibit triangle geometry.

9. Ultrasonic welding device according to claim 8, wherein the triangle geometry is equilateral triangle geometry.

10. Ultrasonic welding device according to claim 9, wherein on average, the projections exhibit triangle geometry regarding their sides, enclosing an angle α of 60° or 90°.

11. Ultrasonic welding device according to claim 1, wherein the coupling surfaces are maintained in contact by a bolt centrally disposed within the surfaces.

12. Ultrasonic welding device according to claim 1, additionally comprising a second slide element attached to a second support by coupling surfaces in contact with each other for achieving a formfitting connection.

13. An ultrasonic welding device, comprising a a sonotrode and a multipart anvil delimiting a compression chamber,
said multipart anvil comprising a slide element, a working part with at least one working surface, at least a part of the working surface delimiting said compression chamber, and a support for the slide member, the support being slidable to open and close the compression chamber,
said working part and said slide element having coupling surfaces in contact with each other for achieving a formfitting connection,
wherein a first of said coupling surfaces comprises linear-shaped projections, and is coupled with a second of said coupling surfaces comprising wave geometry, whereby the recesses of the second coupling surface correspond geometrically to the projections of the first coupling surface.

14. Ultrasonic welding device according to claim 13, wherein the projections, on average, follow a sinusoidal path.

15. An ultrasonic welding device, comprising a sonotrode and a multipart anvil delimiting a compression chamber,
said multipart anvil comprising a slide element, a working part with at least one working surface, at least a part of the working surface delimiting said compression chamber, and a support for the working part, the support being slidable to open and close the compression chamber,
said working part and said slide element having coupling surfaces in contact with each other for achieving a formfitting connection,
wherein a first of said coupling surfaces comprises linear-shaped projections, and is coupled with a second of said coupling surfaces comprising saw tooth geometry, whereby the recesses of the second coupling surface correspond geometrically to the projections of the first coupling surface.

* * * * *